Figure 1:
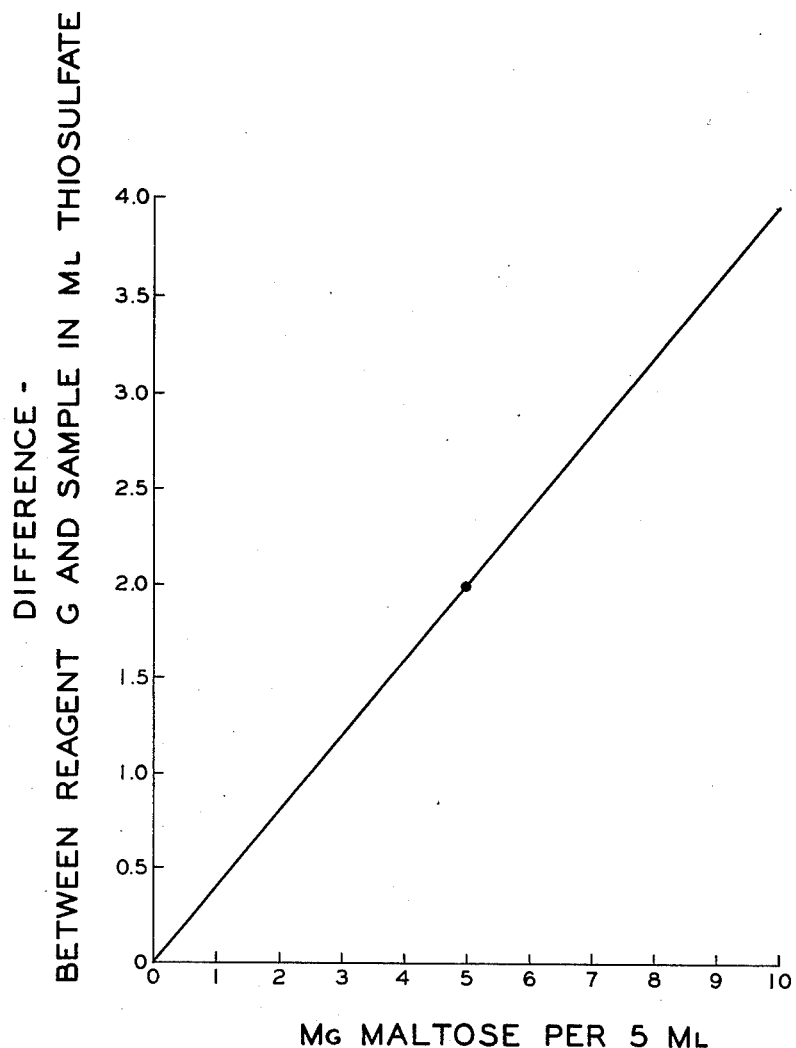

United States Patent Office 2,695,863
Patented Nov. 30, 1954

2,695,863

PROCESS FOR PREPARING ALPHA AMYLASE

Philip A. Tetrault, West Lafayette, and Egon Stark, Lafayette, Ind., assignors to Purdue Research Foundation, Lafayette, Ind., a corporation of Indiana Application April 16, 1952, Serial No. 282,645

14 Claims. (Cl. 195—66)

Our invention relates to the production of alpha amylase. More particularly, our invention relates to the production of thermophilic bacterial alpha amylase and the recovery thereof.

Alpha amylase is an ezyme capable of breaking down starch to reducing sugars and consequently it can be used to replace malt, which is not stable at temperatures above about 60° C., in the production of alcohol wherein the principal raw material is corn, the starch content of which is broken down to reducing sugars, and the latter then fermented to produce the alcohol. Alpha-amylases produced by fungi have been used for this purpose, i. e. to replace malt in alcohol production, however alpha amylase produced by a fungus is also unstable and generally heat inactivated at the temperatures at which malt is cooked in processes for the production of alcohol. As for bacterial alpha amylases, they have ordinarily been produced by mesophilic bacteria and consequently do not act to break down starch at temperatures above about 60° C.

Many investigators have attempted to produce alpha amylase by a fermentation process employing thermophilic bacteria and while sometimes able to demonstrate the presence of alpha amylase in the culture medium, the investigators generally have not been able to recover the cell-free alpha amylase from the medium in which it it produced. Imshenetskii and Solntseva, Mikrobiol. U. S. S. R. 13, 54 (1944) (see Chemical Abstracts 39, 3807) have described a process for the production of alpha amylase by the thermophilic bacteria Bacillus diastaticus but these investigators were unable to recover the cell-free alpha amylase without its being contaminated with large amounts of ammonium sulfate.

We have now discovered a process for the production and recovery of bacterial alpha amylase of a thermophilic nature which is cell-free, which is uncontaminated by ammonium sulfate, which is not only capable of withstanding high temperatures up to about 100° C. but is also capable of breaking down starch to reducing sugars at these high temperatures.

Our process consists essentially of cultivating the organism Bacillus stearothermophilus on a nutrient medium having a high protein content and subsequently precipitating the alpha amylase from the cell-free medium by the addition thereto of an organic water-miscible solvent such as for example acetone, and lower aliphatic alcohols, e. g. methanol, ethanol, isopropanol, etc.

In the practice of our invention, we first prepare a nutrient medium containing at least about 2% proteinaceous material and starch in an amount up to about 10%, the medium being made up to volume with water. In this connection, we have discovered that if less than about 2% proteinaceous material is employed in the medium, the alpha amylase cannot subsequently be precipitated from the medium following its production therein by fermentation. Proteinaceous materials suitable for use in the practice of our invention include dry yeast, fish meal, ground corn, cottonseed meal, yeast extract, as well as various commercial materials consisting essentially of peptone, tryptone, or proteoses, etc. A particularly good protein source for culture media useful in our invention is a tryptic digest of casein which is known commercially as Trypticase, produced by Baltimore Biological Laboratories. Various other materials can be employed such as meat extract, milk whey, casein, soybean meal, etc., as well as mixtures of the above, such as, for example, tryptone and yeast extract, tryptic digest of casein and yeast extract, etc. We prefer to employ about 4% proteinaceous material in our nutrient media as this amount insures subsequent precipitation of the cell-free alpha amylase preparation.

Starch which we can employ in our nutrient medium in which alpha amylase is produced can be soluble starch or any of the common insoluble starches such as rice starch, corn starch, potato starch, arrowroot starch, etc. The source of the starch is not critical and consequently, we intend to include in the term "starch" all of the various known forms, whatever their source. Since alpha amylase is formed from the proteins present in the nutrient medium and not from the starch, the role of starch is in the nature of a template or stimulant and the amount to be used falls within a range of about 0.2 to about 10%. We have obtained particularly satisfactory results employing 1% starch and therefore prefer this amount.

The nutrient medium is inoculated with a culture of the organism Bacillus stearothermophilus, a strain of which is on deposit at the American Type Culture Collection as its No. 7954. However, we have successfully employed thirty-four other strains of the organism in our process and therefore do not intend for the process as herein described and claimed to be limited to any one particular strain of the organism.

Following inoculation, the fermentation is conducted at a temperature ranging from about 37° C. to about 70° C. within which limits growth occurs. However, we prefer to maintain the temperature in the range 50 to 70° C. and more particularly at 65° C., at which temperature we have obtained the best results. During the fermentation, we maintain the pH of the medium at a value ranging between about 5.5 and 8.5 within which range the organism grows satisfactorily. However we prefer to employ a pH of 6.0 at which we have obtained the best results.

The organism Bacillus stearothermophilus is an aerobic organism and thus must be grown in the presence of air if any growth is to occur. Consequently, the organism can be grown on the surface of shallow layers of the medium or it can be grown in aerated submerged cultures, wherein deep tanks are employed with air being supplied thereto. We have employed both processes and found them satisfactory in the production of alpha amylase, the deep tank method of course being the most satisfactory insofar as commercial production is concerned.

The fermentation is continued until the maximum yield of alpha amylase is obtained. Generally the time of the fermentation can be said to range from 12 to 48 hours although we have demonstrated that alpha amylase activity is present in the medium in as short a period as four hours from the time the fermentation is begun. Generally the yield reaches a maximum after about twelve hours but considerably less than the longer time limit, and consequently we prefer to carry out the fermentation for a period of about 12 hours.

Following production of the alpha amylase in the nutrient medium, we then recover the alpha amylase by first removing the solids from the medium and then precipitating the alpha amylase from the cell-free medium by the addition of a precipitating agent more particularly described below. The solids can be removed from the medium in any of the usual ways such as for example by filtration, centrifugation, etc. Many times it is advantageous to employ the alpha amylase in solution and consequently in such situations precipitation is not necessary, the solution remaining following removal of the cells from the nutrient medium being satisfactory for this purpose. In this connection, it is to be noted that prior to our invention, the presence of alpha amylase could not be demonstrated in nutrient media after the cells had been removed therefrom. Concentration of the cell-free media improves their potency and such procedure is preferred.

After separating the solids from the nutrient medium and obtaining the cell-free solution of the alpha amylase, we then precipitate the alpha amylase by adding to the medium a precipitating agent. Generally protein precipitating agents are operative in our invention. We prefer organic water-miscible solvents such as methyl ethyl ketone, acetone, dioxane, and lower aliphatic alcohols including methanol, ethanol, isopropanol, n-propyl alcohol, and tertiary butyl alcohol. We add enough of the solvent to precipitate all of the alpha amylase but generally we have found that from about 1.0 to 2.0 volumes of the precipitating agent per volume of cell-free medium are sufficient to precipitate all of the alpha amylase. Generally we prefer to employ ethyl alcohol as the precipitating agent since it appears to give equally good results no matter what the concentration of alpha amylase in the cell-free nutrient medium might be. We prefer to employ 2 volumes of ethyl alcohol per volume of cell-free nutrient medium containing the alpha amylase since we are generally assured of complete precipitation when this amount is employed.

In connection with the precipitation of the alpha amylase, we have found it desirable to concentrate the cell-free nutrient medium prior to effecting the precipitation since such procedure decreases the amount of precipitating agent needed to obtain a given amount of alpha amylase. We prefer to concentrate the solution to about one-tenth its original volume. Similarly, we have found it desirable to dialyze the nutrient medium prior to concentration since such procedure increases the purity of the final product. We prefer to dialyze the solution in cellophane bags against running tap water for a period of about 24 hours when such procedure is not impractical.

Following precipitation of the alpha amylase from the cell-free nutrient medium, it can be recovered from the medium by any suitable means such as by filtration, centrifugation, etc. Following recovery of the precipitated alpha amylase from the medium, the material is dried to obtain the final preparation having exceptional alpha amylase activity. The drying can be effected in vacuo at room temperature over calcium chloride or it can be effected at temperatures up to about 65° C. without decrease in the activity of the alpha amylase preparation.

In order to have some measure of the activity of our alpha amylase preparation we have devised a method for determining reducing sugars produced by the action of alpha amylase on starch which method is based on that of Underkofler et al., Iowa State College Journal of Science, volume 17, page 251 (1943). According to our method, we prepare an alpha amylase solution by dissolving three grams of alpha amylase powder in 100 ml. of 0.0125 M calcium chloride solution and a starch solution containing one per cent starch in distilled water to which is added 0.1 M universal buffer which buffer is prepared by mixing 100 ml. each of 0.2 M monosodium phosphate, 0.2 M boric acid and 0.2 M acetic acid and adjusting to the desired pH with 2 N sodium hydroxide. The alpha amylase solution and the starch (with buffer) solution are then mixed in equal portions and incubated at a particular temperature for a given period of time. The action of the alpha amylase is to break down the starch to reducing sugars and the amount of reducing sugars (largely maltose) is the amount to be measured.

After the incubation of the starch-alpha-amylase preparation, a 5 ml. sample is mixed in a wide (25 x 100 mm.) Pyrex test tube with 5 ml. of reagent G which has the following composition in grams per liter:

| | |
|---|---|
| $CuSO_4 \cdot 5H_2O$ | 37.5 |
| $NaKC_4H_4O_6 \cdot 4H_2O$ | 125 |
| $Na_2CO_3$ anhy | 53 |
| KI | 1 |
| $Na_2SO_4$ anhy | 50 |
| $KIO_3$ | 3.5665 |
| NaOH saturated solution added to adjust pH to 9.48. | |

The two solutions are mixed by shaking and the test tube then closed with a rubber stopper having a capillary tube therein to permit gases to escape. The tube is then immersed in boiling water for one-half hour after which it is cooled in cold water to about 30° C. To the cooled solution is then added 2 ml. of an aqueous solution consisting of 12.5% KI and 25% $K_2C_2O_4 \cdot H_2O$ and the mixture shaken. To the resulting solution is added 1 ml. of 7.5 N sulfuric acid, the acid being added along the side of the test tube so that carbon dioxide which is liberated does not erupt in a violent manner. The tube is then rotated slowly to mix the contents and allowed to stand until clear, after which the contents are titrated with 0.05 N sodium thiosulfate.

In the above method the sodium thiosulfate titrates iodine released by reduced copper which is produced in the solution by the reducing sugars. The relation then is between sugar and thiosulfate. Since the reagent G can be titrated by sodium thiosulfate, a blank is run exactly as above except that 5 ml. of water is substituted for the starch-alpha-amylase preparation. The difference between the two titrations is the measure of the actual amount of reducing sugars present.

To find the amount of reducing sugars produced by action of the alpha amylase on starch, a determination of the amount of reducing sugars present in the starch before mixing with the alpha amylase is necessary and the difference between the amount of thiosulfate used to titrate the starch-alpha-amylase solution after incubation and the amount used to titrate the starch solution alone is the measure of the reducing sugars produced.

It is obvious from the above that a standard curve can be constructed by determining the thiosulfate value of known concentrations of reducing sugars and since maltose is the most prevalent reducing sugar produced by the action of alpha amylase, we have constructed a standard curve which relates ml. of thiosulfate to milligrams of maltose equivalents per 5 ml. In doing this we prepared a number of 5 ml. solutions containing a known number of milligrams of maltose and tested them by the above method to obtain the number of milliliters of thiosulfate solution required for the titration. We then plotted the amount of maltose per 5 ml. against the amount of 0.05 N sodium thiosulfate required to titrate it in the revised Underkofler et al. procedure. This graph is included herein as Figure 1 wherein it can be seen that the graph is a straight line. The data used in constructing the graph are given in the following table.

TABLE I

| Mg. Maltose/5 ml. | Ml. Thiosulfate | Difference between thiosulfate for Maltose and Reagent G alone |
|---|---|---|
| 2 | 8.68 | 0.68 |
| 4 | 7.75 | 1.61 |
| 5 | 7.36 | 2.00 |
| 6 | 6.90 | 2.46 |
| 8 | 6.06 | 3.30 |
| 10 | 5.28 | 4.08 |
| Reagent G alone | 9.36 | |

The following examples are offered to illustrate our invention and while particular procedures and particular materials are employed, we do not intend for our invention to be construed as being limited thereto but rather it is intended that all equivalents within the scope of the invention as defined in this specification and the attached claims be considered as included therein.

*Example I*

A 500 ml. portion of a nutrient medium consisting of 2 Trypticase, 2% yeast extract, and 0.5% soluble starch, made up to volume with water, was inoculated with the organism Bacillus stearothermophilus A. T. C. C. No. 7954 previously developed on a 1% Trypticase-0.5% yeast extract broth for 12 to 15 hours at 65° C. Fermentation was continued for 12 hours at 65° C. after which the cells were separated from the medium by centrifugation and the clear liquid dialyzed against running tap water for 24 hours. The dialyzed medium was concentrated to about one-tenth of its original volume and then 2 volumes of 95% ethyl alcohol were added and the mixture stirred for 1 hour at room temperature. The precipitate which formed was removed by centrifugation and dried in vacuo over technical calcium chloride for 2 days at room temperature. The dried residue was ground to a fine powder and stored in the cold.

The alpha amylase produced in the above experiment was then tested for alpha amylase activity over a temperature range of from 25 to 95° C. The results are shown in the following table expressed in milligrams of maltose per 5 ml. as determined by the revised Underkofler et al. procedure outlined above and the graph shown in Figure 1. The starch-alpha-amylase preparations were incubated for 3 hours at the temperatures shown in the table, the pH being 6.3.

TABLE II

| Temperature, ° C. | Mg. Maltose per 5 ml. |
|---|---|
| 25 | 5.70 |
| 37 | 9.70 |
| 45 | 14.50 |
| 55 | 22.05 |
| 65 | 26.55 |
| 65 | 24.30 |
| 75 | 17.70 |
| 85 | 16.40 |
| 95 | 6.20 |

*Example II*

An alpha amylase preparation was obtained exactly as described in Example I except that the medium was incubated at 70° C. for 24 hours. The fermented medium was processed as described in Example I yielding 2.02 grams of dry alpha amylase preparation. The dry alpha amylase preparation was dissolved in 60 ml. of boiled, distilled water and then 50 ml. was mixed with 50 ml. of a one-fifteenth M phosphate buffer solution containing 2% soluble starch, the pH being 7.0. The starch-alpha-amylase mixture was then incubated at 90° C. for 12 hours with samples being removed at 1, 2, 3, 4, and 9 hours. The amount of reducing sugars produced was determined for each sample by the method of Underkofler et al. described above and expressed as maltose. The results are shown in Table III.

TABLE III

| Hours incubated | Mg. Maltose per 5 ml. |
|---|---|
| 1 | 0.45 |
| 2 | 0.75 |
| 3 | 0.95 |
| 4 | 1.15 |
| 9 | 1.95 |
| 12 | 2.35 |

*Example III*

A series of experiments was conducted wherein different proteins were used in the nutrient medium in which the organism *Bacillus stearothermophilus* was cultured. In cases where the proteins were water-insoluble, they were weighed out, added to distilled water, steamed for 15 minutes at 15 pounds per square inch pressure, filtered through filter paper, and the pH adjusted to 6.5. At this point 1% soluble starch was added and the medium sterilized at 15 pounds pressure for 25 minutes. The organism was cultured in the nutrient medium for 12 hours after which the cells were removed by centrifugation and the alpha amylase precipitated by adding two volumes of ethyl alcohol without dialyzing or concentrating the centrifuged medium. The results are given in Table IV as milligrams of maltose per 5 ml. determined as outlined above and illustrated in the previous examples. In this instance, the starch-alpha-amylase mixture was incubated for 1 hour, after which the milligrams of maltose per 5 ml. were determined.

TABLE IV

| Protein | Amount of Protein in percent | Mg. Maltose per 5 ml. |
|---|---|---|
| Cottonseed meal | 4 | 2.5 |
| Fish meal | 4 | 6.3 |
| Acid-hydrolyzed casein | 4 | 4.3 |
| Ground corn | 8 | 3.6 |
| Soybean meal | 4 | 2.2 |

*Example IV*

A series of experiments was conducted wherein different agents were employed to precipitate the alpha amylase from the nutrient medium following culture of the organism therein. In each experiment a nutrient medium consisting of 3% Trypticase, 3% yeast extract, and 1% soluble starch, with the medium made up to volume with water, was inoculated with the organism *Bacillus stearothermophilus* and cultured at 65° C. for 12 hours, after which the medium was centrifuged and the alpha amylase then precipitated using the agents shown in the following table. The results are expressed as milligrams of maltose per 5 ml., with the starch-alpha-amylase mixture being incubated for 1 hour at 65° C. In each case 1 volume of precipitating agent was employed. The results are given in the following table.

TABLE V

| Precipitating Agent | Amount of Agent, vol. | Mg. Maltose per 5 ml. |
|---|---|---|
| Ethyl alcohol | 1 | 13.4 |
| Isopropyl alcohol | 1 | 11.6 |
| Acetone | 1 | 15.8 |
| Methyl alcohol | 1 | 17.4 |

Now having described our invention, what we claim is:

1. A process for producing alpha amylase which comprises cultivating the organism *Bacillus stearothermophilus* on a nutrient medium containing starch and at least about two per cent proteinaceous material.

2. A process for producing alpha amylase which comprises cultivating the organism *Bacillus stearothermophilus* on a nutrient medium containing starch and at least about two per cent proteinaceous material, removing the solids, precipitating alpha amylase by adding a water-miscible organic solvent to the solution and recovering the precipitated cell-free alpha amylase.

3. The process of claim 2 wherein the water-miscible organic solvent is selected from the group consisting of acetone, methanol, ethanol, and isopropanol.

4. A process for producing alpha amylase which comprises cultivating the organism *Bacillus stearothermophilus* at a temperature between about 50 and 70° C. on a nutrient medium containing at least about two percent proteinaceous material and from about 0.2 to about 10% starch, removing the solids, precipitating alpha amylase by adding a water-miscible organic solvent to the solution and recovering the precipitated cell-free alpha amylase.

5. In a process for producing alpha amylase the step which comprises cultivating the organism *Bacillus stearothermophilus* on a nutrient medium containing at least about 2% proteinaceous material.

6. In a process for producing alpha amylase, the step which comprises cultivating the organism *Bacillus stearothermophilus* on a nutrient medium containing at least about 4% proteinaceous material.

7. In a process for producing alpha amylase, the step which comprises cultivating the organism *Bacillus stearothermophilus* on a nutrient medium containing about 4% of a mixture of yeast extract and tryptic digest of casein.

8. In a process for producing alpha amylase, the step which comprises cultivating the organism *Bacillus stearothermophilus* on a nutrient medium containing at least about 2% of a mixture of yeast extract and tryptic digest of casein.

9. A process for producing alpha amylase which comprises cultivating the organism *Bacillus stearothermophilus* at a temperature between about 50 and 70° C. on a nutrient medium containing at least about 2% of a mixture of yeast extract and tryptic digest of casein and about 1% starch, removing the solids, precipitating alpha amylase by adding ethyl alcohol to the solution and recovering the precipitated cell-free alpha amylase therefrom.

10. A process for producing amylase which comprises cultivating the organism *Bacillus stearothermophilus* at a temperature between about 50 and 70° C. on a nutrient medium containing at least about 4% dry yeast and about 1% starch, removing the solids, precipitating alpha amylase by adding ethyl alcohol to the solution and recovering the precipitated cell-free alpha amylase therefrom.

11. A process for producing alpha amylase which comprises cultivating the organism *Bacillus stearothermophilus* at a temperature between about 50 and 70° C. on a nutrient medium containing at least about 4% fish meal and about 1% starch, removing the solids, precipitating alpha amylase by adding ethyl alcohol to the solution and recovering the precipitated cell-free alpha amylase therefrom.

12. A process for producing alpha amylase which comprises cultivating the organism *Bacillus stearothermophilus* at a temperature between about 50 and 70° C. on a nutrient medium containing a decoction of at least about 4% cottonseed meal and about 1% starch, removing the solids, precipitating alpha amylase by adding ethyl alcohol to the solution and recovering the precipitated cell-free alpha amylase therefrom.

13. A process for producing alpha amylase solutions which comprises cultivating the organism *Bacillus stearothermophilus* on a nutrient medium containing at least about 2% proteinaceous material and from about 0.2 to about 10% starch, and removing the solids from the medium following production of alpha amylase therein.

14. A process for producing alpha amylase solutions which comprises cultivating the organism *Bacillus stearothermophilus* at a temperature between about 50 and 70° C. on a nutrient medium containing at least about 2% proteinaceous material and from about 0.2 to about 10% starch, removing the solids from the medium and concentrating the resulting solution to the desired volume.

References Cited in the file of this patent

UNITED STATES PATENTS

| Number | Name | Date |
|---|---|---|
| 1,227,525 | Boidin | May 22, 1917 |

OTHER REFERENCES

Oppenheimer; Die Fermente and Ihre Wirkungen, Fünfte Auflage, 1925 (Wortmann), pages 712, 715.

Bergey's Manual of Determinative Bacteriology, 6th edition, page 734.